(12) United States Patent
Simmons

(10) Patent No.: US 6,396,852 B1
(45) Date of Patent: May 28, 2002

(54) RING BUNDLING IN THE DESIGN OF RINGS FOR TELECOMMUNICATIONS NETWORKS

(76) Inventor: Jane Marie Simmons, 46 Birch La., Eatontown, NJ (US) 07724

( * ) Notice: Subject to any disclaimer, the term of this patent is extended or adjusted under 35 U.S.C. 154(b) by 0 days.

(21) Appl. No.: 08/972,465

(22) Filed: Nov. 18, 1997

(51) Int. Cl.[7] .............................................. H04L 12/28
(52) U.S. Cl. ..................... 370/535; 370/538; 370/907; 370/224
(58) Field of Search ................................ 370/222, 224, 370/535, 257, 258, 223, 537, 538, 907, 458, 460; 359/110, 119, 124, 127

(56) References Cited

U.S. PATENT DOCUMENTS

| | | | | |
|---|---|---|---|---|
| 4,491,947 A | * | 1/1985 | Frank | 370/323 |
| 5,018,135 A | * | 5/1991 | Ashi et al. | 370/535 |
| 5,442,623 A | * | 8/1995 | Wu | 370/224 |
| 5,546,542 A | * | 8/1996 | Cosares et al. | 709/241 |
| 5,576,875 A | * | 11/1996 | Chawki et al. | 359/125 |
| 5,717,795 A | * | 2/1998 | Sharma et al. | 385/24 |
| 5,717,796 A | * | 2/1998 | Clendening | 385/24 |
| 5,745,476 A | * | 4/1998 | Chaudhuri | 370/222 |
| 5,754,528 A | * | 5/1998 | Uchida | 370/222 |
| 5,760,934 A | * | 6/1998 | Sutter et al. | 359/119 |
| 5,793,745 A | * | 8/1998 | Manchester | 370/224 |
| 5,815,490 A | * | 9/1998 | Lu | 370/223 |
| 5,841,760 A | * | 11/1998 | Martin et al. | 370/242 |
| 5,867,502 A | * | 2/1999 | Chang | 370/477 |
| 5,896,378 A | * | 4/1999 | Barker | 370/384 |
| 5,903,371 A | * | 5/1999 | Arecco et al. | 359/119 |
| 5,930,016 A | * | 7/1999 | Brorson et al. | 359/127 |
| 6,061,335 A | * | 5/2000 | De Vito et al. | 370/258 |
| 6,097,516 A | * | 8/2000 | Almstrom | 359/119 |

OTHER PUBLICATIONS

Survivable SONET Networks—Design Methodology, by Wasem, Wu and Cardwell, reprinted from IEEE J. Selected Areas Communi., vol. 12, No. 1, pp. 200–207, Jan. 1994.

"Planning and Deploying a SONET–based Metro Network" by To and McEachern, reprinted from IEEE Maga. Lightwave Telecommuni. Sys., vol. 2, No. 4, pp. 123–127, Nov. 1991.

"Clustering for the Design of SONET Rings in Interoffice Telecommunications" by Laguna, *Management Science*, vol. 40, No. 11, pp. 1533–1541, Nov. 1994.

"A Class of Self–Healing Ring Architectures for SONET Network Applications" by Wu and Lau, *Globecom '90*, San Diego, pp. 444–451, Dec. 1990.

*Fiber Network Service Survivability* by Wu, Artech House, Inc., Norwood, Massachusetts, pp. 123–144, 185–187 and 207–210, 1992.

* cited by examiner

*Primary Examiner*—Chau Nguyen
*Assistant Examiner*—Jasper Kwoh

(57) ABSTRACT

A process for ring bundling reduces the number of add/drop multiplexers required for a ring deployed in a telecommunications network. The input into the process is a list of all the time slots for a ring and the offices of the ring where each of the time slots adds or drops traffic. The process groups together time slots having many add/drops in common to maximize the number of offices where all the time slots pass through without adding or dropping traffic. OC-3 time slots are initially grouped in pairs, then in fours, then in eights, and finally in groups of sixteen to form one or more OC-48 optical signals transported in the ring.

23 Claims, 7 Drawing Sheets

RING BUNDLING IN THE DESIGN OF RINGS FOR TELECOMMUNICATIONS NETWORKS

FIELD OF THE INVENTION

This invention relates to rings used in a telecommunications network, and more particularly to a process for use in designing such rings which reduces the number of add/drop multiplexers used in the ring.

BACKGROUND OF THE INVENTION

In recent years, telecommunications network providers have been faced with satisfying user demand for significantly higher network capacity and greater reliability. To handle the capacity demands, long distance carriers are turning to Synchronous Optical Network ("SONET") and Wavelength Division Multiplexing ("WDM") to provide networks with gigabit per second links. To meet the demands for greater reliability, self-healing rings are being deployed to provide restoration times on the order of tens of milliseconds in the event of a cable cut or an office failure. These network upgrades will necessitate billions of dollars of new equipment installation. Ring design techniques that reduce the amount of terminal equipment required in rings, and therefore reduce the cost of deploying rings in a network, are becoming increasingly commercially important.

Designing rings to be deployed in a network is a multi-step process. Typically, the first step is laying out the topology of the rings, which involves selecting the offices (or nodes) that when connected by fiber will make up the various rings. In a national-scale network, there are likely to be tens of rings.

The next step is to route traffic demands between the offices. The input into this process is the traffic demand matrix between each pair of offices, where the granularity of the demands is OC-M, for some $M \geq 1$ (OC-1 is the smallest SONET carrier level, representing 50 Mbit/sec; OC-M represents "M" times this rate).

Once the path for each OC-M has been laid out, the next step is to group the OC-Ms together to form OC-Ns (for $N \geq M$), where OC-N is the optical line rate. A commercially important embodiment is a ring in which M equals three (3) and N equals forty-eight (48), although the discussion holds for more general N and M.

In a backbone network, there are typically multiple OC-48s (i.e., multiple OC-48 optical signals) that must be routed on a single ring; such multiplicity of OC-48s is often referred to as 'stacked rings'. Using WDM techniques up to eight OC-48s (or more, depending on the technology) can be multiplexed on a single fiber. When multiple OC-48s are present in a ring, there are numerous ways to group the OC-3s (time slots) to form the OC-48s (optical signals). Such grouping process is commonly referred to as 'ring bundling'.

The choice of techniques used to accomplish the ring design steps enumerated above (i.e., topology design, routing, ring-bundling) can greatly impact the cost of the network. One design approach is to integrate all of the steps into a single optimization problem, where minimizing cost is the objective. However, in a national-scale network, the size and complexity of such an integrated approach would likely make the problem intractable. Alternatively, each of the steps can be considered an independent problem, with heuristics applied to each step.

Topology design strategies are discussed in the article by Wasam, O. J., Wu, T. H., and Cardwell, R. H., entitled "Survivable SONET networks-design methodology," *IEEE Journal on Selected Areas in Communications*, vol. 12, no. 1, pp. 205–212, January, 1994; the article by To, M., and McEachern, J., entitled "Planning and deploying a SONET-based metro network," *IEEE LTS*, vol. 2, pp. 19–23, November, 1991; and the article by Laguna, M., entitled "Clustering for the design of SONET rings in interoffice telecommunications," *Management Science*, vol. 40, No. 11, pp. 1533–1541, November, 1994. Routing traffic demands between offices of the ring is typically done with variations of shortest-path routing that take into account load balancing.

Conventionally, the OC-48 optical signal is terminated at each office in the ring in an add/drop multiplexer ("ADM"). The ADM provides a multiplexing function between the OC-48 signal and lower rate signals such as OC-1 or OC-3 signals. The ADM allows these lower rate signals to be dropped and added at the office, while passing (i.e., allowing to pass through) the signals that do not need to be dropped. If no portion of the OC-48 signal needs to be dropped at an office, then it is possible to remove the ADM from the office, and have the OC-48 'express' through the office instead of being terminated. ADMs for OC-48 signals cost on the order of hundreds of thousands of dollars. Thus, eliminating ADMs from the ring can result in significant cost savings.

SUMMARY OF THE INVENTION

A process for ring bundling according to the invention reduces the number of ADMs required for a ring deployed in a telecommunications network by grouping lower rate signals together that pass through the same office. The input into the process is a list of all the time slots (i.e., channel assignments) for a ring and the offices where each of the time slots adds or drops traffic. Time slots that have many add/drops in common are grouped together according to the process. For example, if the time slots are at the OC-3 signal rate, initially they are grouped in pairs, then in fours, then in eights, and finally in groups of sixteen to form an OC-48 optical signal.

According to an illustrative embodiment of the invention, a 'compatibility' metric is calculated for each pair of time slots. The pairs are then sorted from most compatible to least compatible. Beginning with the most compatible pair, pairs of time slots are selected to form time-slot pairs, until every time slot is included in one and only one time-slot pair. Next, a compatibility metric is calculated for each pair of time-slot pairs (four time slots). The sets of four time slots are sorted from most compatible to least compatible. Beginning with the most compatible pair of time-slot pairs, pairs of time-slot pairs are selected until every time slot is selected once and only once. Then, time slots are grouped into sets of eight, and finally into groups of sixteen. The add/drops that are present in a group of sixteen time slots represent the offices of the ring where ADMs are required.

Other features and advantages of the invention will become apparent from the following detailed description, taken in conjunction with the accompanying drawings, which illustrate, by way of example, the features of the invention.

DETAILED DESCRIPTION OF THE INVENTION

To meet customer demands for greater reliability, long distance carriers are deploying self-healing rings to provide restoration times on the order of tens of milliseconds in the event of a failure. This description focuses on the application of the invention to four-fiber bidirectional rings, also known as B-SHR/4 rings. However, ring bundling techniques in accordance with the invention are also applicable to unidirectional rings and two-fiber rings. Various architectures for self-healing rings (SHR) are described in the article by Wu, T. -H. and Lan, R. C., entitled "A class of self-healing ring architectures for SONET network applications," *Globecom*, San Diego, 1990; and in the book by Wu, T. -H., entitled *Fiber Network Service Survivability*, Artech House, Inc., Massachusetts, 1992.

Figure 1:
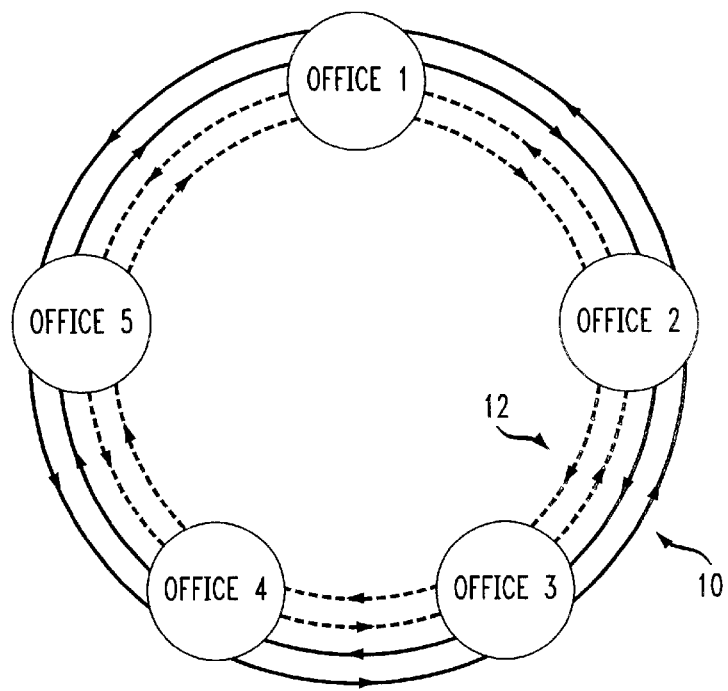
FIG. 1 shows a representation of a four-fiber bidirectional ring with five offices.

An example of a B-SHR/4 ring with five offices is shown in FIG. 1. Referring to FIG. 1, there are a total of four fibers, with two of the fibers designated as working fibers 10 (shown with solid lines) and two of the fibers designated as protection fibers 12 (shown with broken lines). One of the working fibers 10 carries traffic in the clockwise direction, and the other working fiber carries traffic in the counterclockwise direction; the same is true for the two protection fibers 12.

Figure 2:
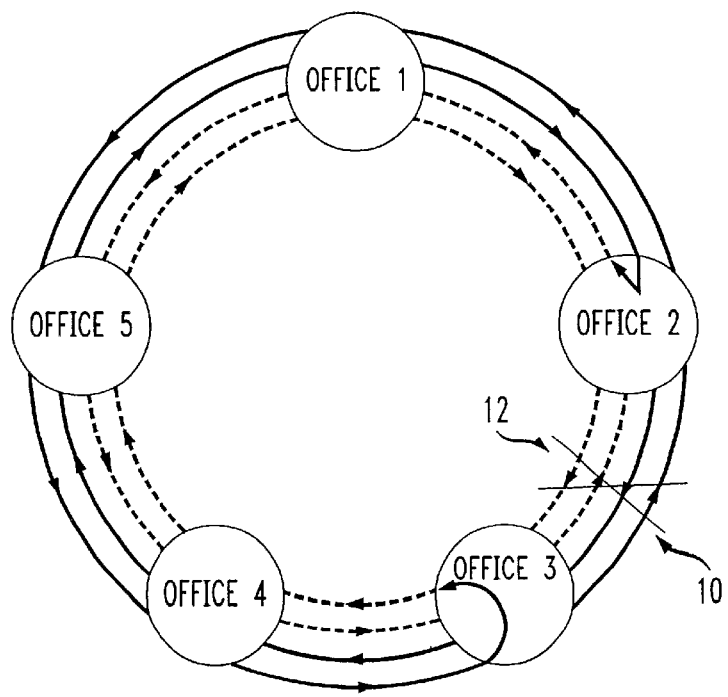
FIG. 2 shows a representation of a four-fiber bidirectional ring with all four fibers cut between two offices.

Under normal conditions, all traffic is carried on the working fibers 10. If a failure occurs, the protection fibers 12 can be used to restore traffic flow around the ring. For example, referring to FIG. 2, assume there is a fiber cut between Office 2 and Office 3 such that all four fibers are cut. Traffic that would normally flow clockwise on one of the working fibers 10 from Office 2 to Office 3 is sent counterclockwise from Office 2 to Office 3 via one of the fibers in the protection link 12, thus restoring the traffic flow. Similarly traffic that normally flows counterclockwise from Office 3 to Office 2 is restored via the clockwise path of the protection fibers 12. It is required that this recovery procedure, known as automatic protection switching, occur within fifty (50) milliseconds for rings with less than one thousand two hundred (1200) kilometers of fiber.

Figure 3:
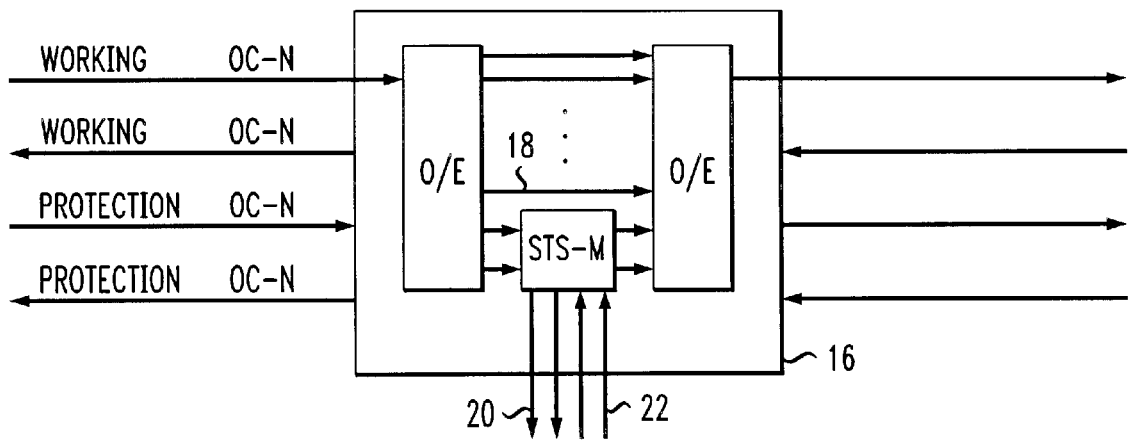
FIG. 3 shows a representation of an add/drop multiplexer.

Referring to FIG. 3, each office in a ring typically includes an add/drop multiplexer (ADM) 16. If the ring is a B-SHR/4 (i.e. conforms to the B-SHR/4 format), then an ADM is used that is capable of terminating all four fiber lines. For example, in FIG. 3 if N=48 and M=3 then the optical line rate is OC-48, and the electrical signals are multiplexed/demultiplexed at the (synchronous transport signal) STS-3 rate of 155 Mbit/sec. The ADM 16 converts the optical signal to an electrical signal; multiplexing and demultiplexing are done in the electrical domain. Some of the incoming STS-3 signals 18 pass through the office, while others 20 need to be dropped at the office; also, some STS-3 signals 22 are added at the office. The signals that pass through are multiplexed with the added signals to form an outgoing OC-48.

The OC-48 signal is channelized into sixteen (16) OC-3 time slots. An ADM can have two different multiplexing schemes: in the Time Slot Interchange (TSI) arrangement, an OC-3 can enter the ADM on channel i and exit the ADM on channel j, where i≠j; in the Time Slot Assignment (TSA) scheme, an OC-3 must enter and exit on the same channel. TSI is more costly and results in more complex network management, thus ADMs with the TSA architecture are more common.

Figure 4:
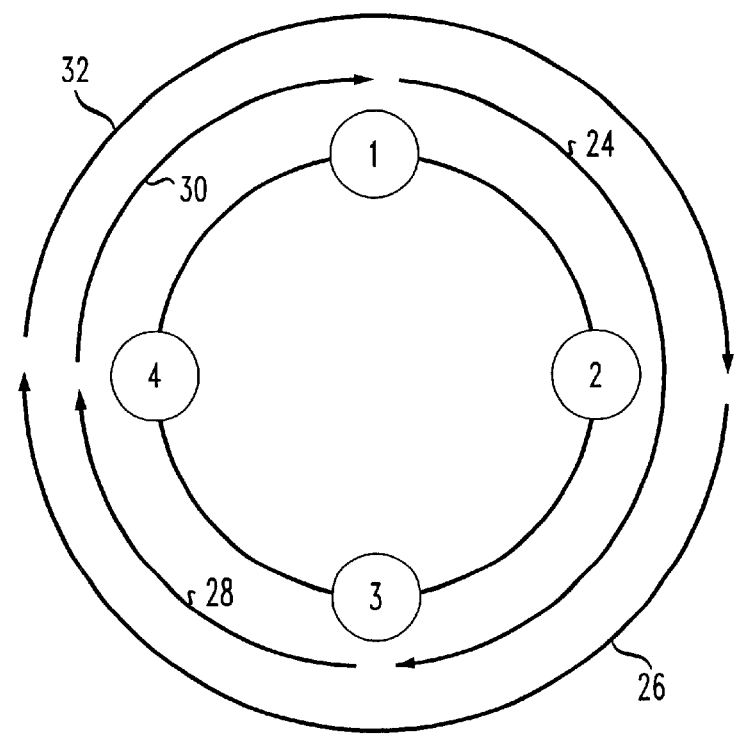
FIG. 4 shows a representation of a traffic flow pattern in a four-office ring.

If TSA is used, time slot packing is done as illustrated in the following example. For simplicity, assume that the time slot granularity is OC-24 instead of OC-3, so that there are two time slots per OC-48. Refer to the four-office ring shown in FIG. 4. Assume that the following traffic flows are desired (assume all flows are in the clockwise direction):

1 OC-24 from Office 1 to Office 3 (shown as 24),
1 OC-24 from Office 2 to Office 4 (shown as 26),
1 OC-24 from Office 3 to Office 4 (shown as 28),
1 OC-24 from Office 4 to Office 1 (shown as 30),
1 OC-24 from Office 4 to Office 2 (shown as 32).

Figure 5:
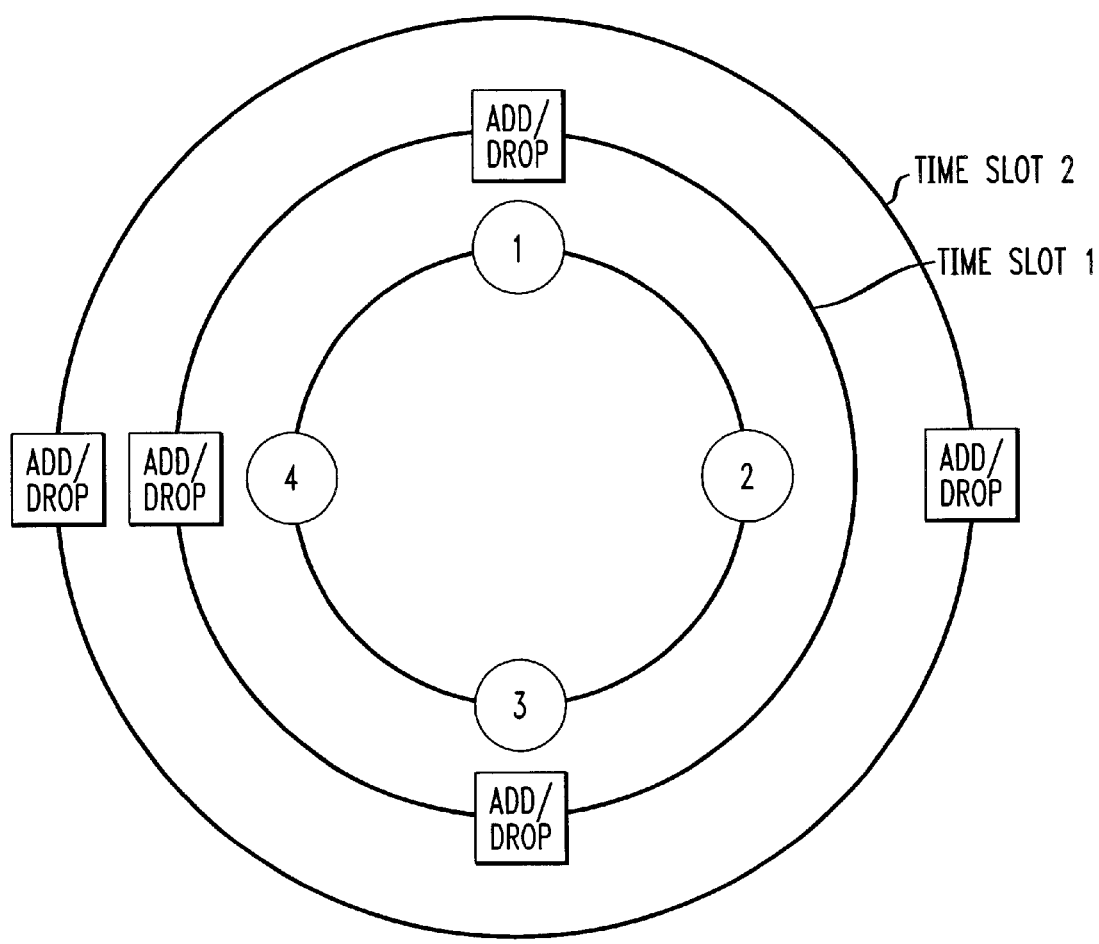
FIG. 5 shows a representation of two time slots accommodating the traffic flow pattern depicted in FIG. 4.

This traffic flow pattern can be accommodated by two time slots, as shown in FIG. 5; thus, only one OC-48 is needed to carry all the traffic. In FIG. 5, squares are placed at offices to represent where traffic from a particular time slot needs to be added or dropped. Thus, in FIG. 5 Time Slot 1 add/drops traffic at Offices 1, 3, and 4; and Time Slot 2 adds/drops traffic at Offices 2 and 4. If a time slot passes through an office, then no square is present on that time slot for that office. Note that if the OC-24 from Office 3 to Office 4 (28, FIG. 4) were assigned to Time Slot 2, and all other assignments were left unchanged, then a conflict would arise in this time slot because the OC-24 from Office 2 to Office 4 (26, FIG. 4) is also assigned to Time Slot 2, which would necessitate an additional OC-48.

Optimal time slot assignments can be generated using commercially available graph coloring algorithms, where optimal refers to an assignment that results in the fewest OC-48s.

If no portion of the optical signal needs to be dropped at an office, then it is possible to remove the ADM from the office, and have the signal 'express' through the office instead of being terminated. As shown in the drawings for purposes of illustration, the invention provides a ring bundling process which groups traffic together that passes through the same offices, thereby reducing the number of ADMs and terminal equipment required in the ring to reduce the cost of deploying rings in a network. The ring bundling process according to the invention potentially eliminates on the order of thirty to fifty percent of the ADMs required to be deployed in rings.

According to an illustrative embodiment of the invention, the optical line rate is OC-48 and the time slot granularity is OC-3. Sixteen OC-3 time slots are grouped together to form an OC-48 optical signal after the steps of traffic routing and time slot assignment have already been performed. If any one of the sixteen time slots is added or dropped at a particular office, then an ADM will still be deployed at that particular office for that particular OC-48. If all sixteen time slots pass through an office, then no ADM will be present in that office for that particular OC-48 (i.e., the OC-48 'expresses' through the office). It is assumed that traffic flows in the ring are symmetric, i.e., the traffic flows in the ring are the same in the clockwise and counterclockwise direction.

If multiple OC-48s are multiplexed on a ring, then there are numerous choices for grouping time slots together to form OC-48s. Since ADMs are assigned on a per OC-48 basis, multiple ADMs may be deployed per office. The goal of the ring bundling process is to group the time slots so that the number of required ADMs is minimized, in other words so that the number of offices through which all sixteen time slots in an OC-48 pass is maximized. Finding the optimal solution is computationally intractable even for reasonably sized rings. The invention performs very well in reducing the number of ADMs required, as confirmed by experimental results. Each ADM that can be eliminated represents a cost savings in the hundreds of thousands of dollars. While rings are used in both the access and backbone portions of carrier networks, the ring bundling process is even more relevant in a long distance network where stacked rings are more likely to occur.

The input into the process is a list of all the time slots for a ring and the add/drops for each of the time slots (i.e., the offices where the time slot adds or drops traffic). Time slots having many add/drops in common are grouped together. Initially, they are grouped in pairs, then in fours, then in eights, and finally in groups of sixteen to form an OC-48 optical signal.

The process can be implemented in software, and required roughly two hundred lines of C code to program on a personal computer ("PC"). The run-time for the computer program for various experimental scenarios was in each case less than three minutes on a 133 MHz laptop PC.

The first step of the process is to calculate a 'compatibility' metric for each pair of time slots. There are various metrics that can be used. The pairs are then sorted from most compatible to least compatible. Beginning with the most compatible pair, pairs of time slots are selected until every time slot is included in one and only one pair. These selected pairs are referred to as time-slot pairs. Next, a compatibility metric is calculated for each pair of time-slot pairs. Thus, we are looking at sets of four time slots. Again, the sets are sorted from most compatible to least compatible. Beginning with the most compatible pair of time-slot pairs, pairs are selected until every time slot is selected once and only once. This process continues for two more steps, where time slots are grouped into sets of eight, and finally into groups of sixteen. The add/drops that are present in a set of sixteen time slots represent offices in the ring where ADMs are required.

The process also works for the case where the number of time slots is not an integral multiple of sixteen. In this case, each step of the process will not necessarily produce full pairings. For example, if there are forty-four time slots, then there will be twenty-two time-slot pairs, and eleven time-slot quads. However, in the third step of the process, only five sets of eight time slots will be produced, with one set of four time slots left over. In the final step, two sets of sixteen time slots are produced and one set of twelve time slots.

There are several compatibility metrics that can be used as a measure of how 'compatible' two sets of time-slots are. For example, let A equal the number of add/drops that are in set 1, let B equal the number of add/drops in set 2, and let D equal the number of add/drops that are in both set 1 and set 2. Thus, A+B−D represents how many add/drops are in the union of set 1 and set 2. For example, if time slot 1 add/drops at offices 1, 5 and 8, and time slot 2 add/drops at offices 2 and 5, then A equals 3, B equals 2, and D equals 1.

Four. possible metrics are:

Metric 1: (A+B−D)/(A+B);

Metric 2: (A+B−D)−(A)+(A+B−D)−(B)=A+B−2D;

Metric 3: (A+B−D);

Metric 4: min (A−D, B−D).

Metric 1 is the ratio of how many add/drops there are in the union of the two time slot sets to the sum of the add/drops in the individual sets. (This can be considered how 'efficient' the pairing is.) The value for this metric ranges from 0.5 to 1. The second metric is a measure of how many add/drops are added by unioning the two time slot sets (e.g., originally time slot set 1 has A add/drops; after being paired, the union will have A+B−D add/drops). The value for this metric is an integer greater than or equal to 0. Metric 3 is a greedy type of a metric that is simply a measure of how many add/drops there are in the union of the time slot sets. This metric is an integer greater than or equal to 2. The fourth metric favors cases where the add/drops of one of the time slot sets are included in the other time slot set. The value of this metric is an integer greater than or equal to 0. In all four cases, a lower value indicates that the time slot sets are more compatible. Other metrics are possible, although none of the other metrics tested improved the results.

Using different metrics as a measure of 'compatibility' may produce different results for a given input. No single metric produced the best results in all cases. The process can be run using each one of the metrics, and then choosing the best result.

Also, differing results can be obtained depending on the original ordering of the time slots because many pairs of time slots will yield the same compatibility metric. By permuting the order of the time slots, the pairs will likely be sorted differently, thus yielding a different result. Again, the best result over all the runs of the process is used for the final result.

By way of example, and not limitation, FIGS. 6–9 present a process flow diagram for describing the preferred embodiment of the ring bundling process for use in designing a ring to be deployed in a telecommunications network. The ring bundling process in the preferred embodiment is implemented in software as a program comprising of a set of instructions, which when executed by a processor cause the processor to execute a series of steps. For clarity of explanation, this specific illustrative embodiment of the present invention is presented as a process flow diagram. The steps depicted by the process flow diagram may be provided through the use of either shared or dedicated hardware, including, but not limited to, hardware capable of executing software. For example, the steps presented in FIGS. 6–9 may be provided by a single shared processor. Illustrative embodiments may comprise digital signal processor (DSP) hardware, read-only memory (ROM) for storing software performing the steps discussed below, and random-access memory (RAM) for storing DSP results. Very large scale integration (VLSI) hardware embodiments, as well as custom VLSI circuitry in combination with a general purpose DSP circuit, may also be provided.

The program embodying the ring bundling process is run after traffic has been routed on the ring and assigned to time slots, which are channels that together form the actual signal. For example, a typical signal rate is OC-48 (2.5 Gbit/sec); the OC-48 optical signal is typically comprised of sixteen OC-3 (155 Mbit/sec) time slots.

SONET add/drop multiplexers ("ADMs") are placed in the offices of the ring to allow traffic to be dropped off at an office, or added in at an office. Such an ADM typically operates on the whole signal rate, i.e., if the signal rate is an OC-48 and the time slot granularity is an OC-3, the ADM operates on the whole OC-48 signal, and demultiplexes the signal into its component OC-3s. If there are multiple OC-48s on a ring, then multiple ADMs may need to be placed at a single office of the ring.

The goal of ring bundling according to the invention is to group the OC-3s together in such a way as to minimize the total number of ADMs that must be included on the ring. An ADM must be placed in an office for a particular OC-48 if any OC-3 within the OC-48 adds or drops traffic at an office. If no OC-3 within the OC-48 adds or drops traffic at an office, then no ADM needs to be placed in that office for that OC-48.

The number of possible ways to group time slots together to form line rate signals grows very quickly with the number of time slots. For example, if there are ninety-six OC-3s on a ring, then the number of possible ways to group the OC-3s together to form OC-48s is:

$$\frac{96!}{6!16!16!16!16!16!16!} = 2 \times 10^{67}$$

These are typical numbers for a ring deployed in a long distance network.

The number of possibilities is huge, and prohibits looking at each possible solution and choosing the optimal solution. Thus, it is necessary to develop heuristics to solve the problem. The program embodying the ring bundling process according to the preferred embodiment of the invention has been found to perform better than any conventional technique (i.e., it yields solutions that have the fewest number of required ADMS).

The following definitions are used in the program:
R=Number of offices on the ring
N=Number of time slots for the ring
Each time slot is represented by an R-bit vector:
Bit j of the vector=1 if the time slot add/drops at office j,
Bit j of the vector=0 if the time slot does not add/drop at office j.

For example, assume R=5. One possible time slot could be (0 1 1 0 1). This indicates that the time slot add/drops only at offices 2, 3, and 5 (i.e., on this time slot, office 2 sends traffic to office 3, office 3 sends traffic to office 5, and office 5 sends traffic to office 2).

$T_i$=Initially, this is $i^{th}$ time slot vector, for $1 \leq i \leq N$; after each cycle, the $T_i$ are updated.

$1_R$=the vector comprised of R 1's (1 1 1 ... 1)

E=total number of time slots that together form the signal rate; for example, if the signal rate is an OC-48, and the time slot granularity is an OC-3, then E equals 16. It is assumed that E is always a power of 2.

The process, which is embodied for example in a computer program, starts off by making pairs of two time slots; the combinations are referred to as time-slot pairs. In the next cycle, the program pairs two time-slot pairs, to form time-slot quads. In the next cycle, the program pairs two time-slot quads to form time-slot octets. This process continues until E time slots are bundled together. Thus, the program runs through $\log_2 E$ cycles. For example, for E equal to 16, there are 4 cycles.

The parameter G is used to indicate how large the groupings are. For example, referring to FIG. 6, the program starts with G equal to 1 in step 40, since no time slots have been paired yet. In the next cycle, G is equal to 2, because the program has formed time-slot pairs. In the next cycle, G is equal to 4, because time-slot quads have been formed. Etc.

The variable L is used in step 40 to indicate whether N is evenly divisible by G. If L=0, then it is evenly divisible; if L=1, then it is not. For example, if N=15, and G is 2 then L would equal 1. The variables m and n are the counters for the pairing cycle and are initialized in step 42.

Figure 6:
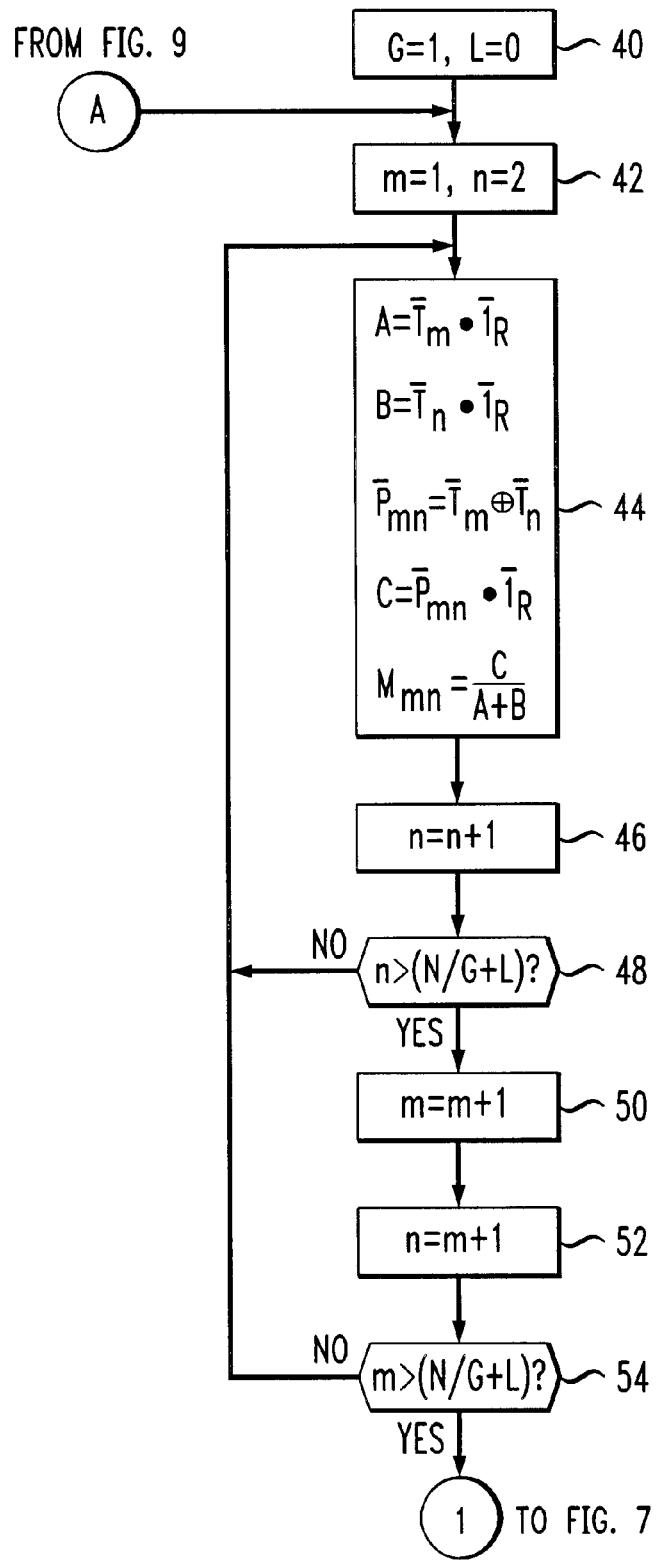
FIGS. 6–9 show a process flow diagram for describing a ring bundling process in accordance with the principles of the invention.

The first step within each cycle is to calculate a compatibility metric for each possible combination. This is shown in FIG. 6, as step 44. The entity being combined varies with each cycle. In the first cycle time slots are being combined. In the second cycle time-slot pairs are being combined. In the third cycle, time-slot quads are being combined. Etc. The variable $T_i$ is used to represent the entity being combined. At each cycle, there are ($\lfloor N/G \rfloor$+L) such $T_i$, where $\lfloor N/G \rfloor$ indicates the greatest integer less than or equal to N/G.

The variables m and n ensure that all possible combinations are considered. For example, if N is 4, then in the first cycle, the combinations are 1,2 1,3 1,4 2,3 2,4 3,4. Steps 46–54 ensure that m and n cycle through all possible combinations.

The compatibility metric is calculated in step 44:
A is the number of add/drops in entity $T_m$. It is calculated by taking the dot product of $T_m$ with the all-1 vector.
B is the number of add/drops in entity $T_n$. It is calculated by taking the dot product of $T_n$ with the all-1 vector.
$P_{mn}$ represents the add/drop locations if $T_m$ and $T_n$ were combined. $P_{mn}$ has an add/drop at a particular office if either $T_m$ or $T_n$ has an add/drop at a particular office. Thus, $P_{mn}$ is formed by a bitwise OR of $T_m$ and $T_n$.
C is the number of add/drops in entity $P_{mn}$. It is calculated by taking the dot product of $P_{mn}$ with the all-1 vector.

The parameter $M_{mn}$ stores the compatibility metric for the combination of $T_m$ and $T_n$. There are many ways to define $M_{mn}$. By changing $M_{mn}$, different solutions can be obtained; it depends on the time slots that are the input into the program. (One strategy is to run the computer program once for each definition of $M_{mn}$, and then choose the best solution, that is the one which yields the smallest number of ADMs.) The following definitions of $M_{mn}$ have been found to work well:

$M_{mn}$=C/(A+B), this is shown in step 44 of FIG. 6;
$M_{mn}$=(C−A)+(C−B);
$M_{mn}$=C;
$M_{mn}$=minimum of (C−A, C−B).

Figure 7:
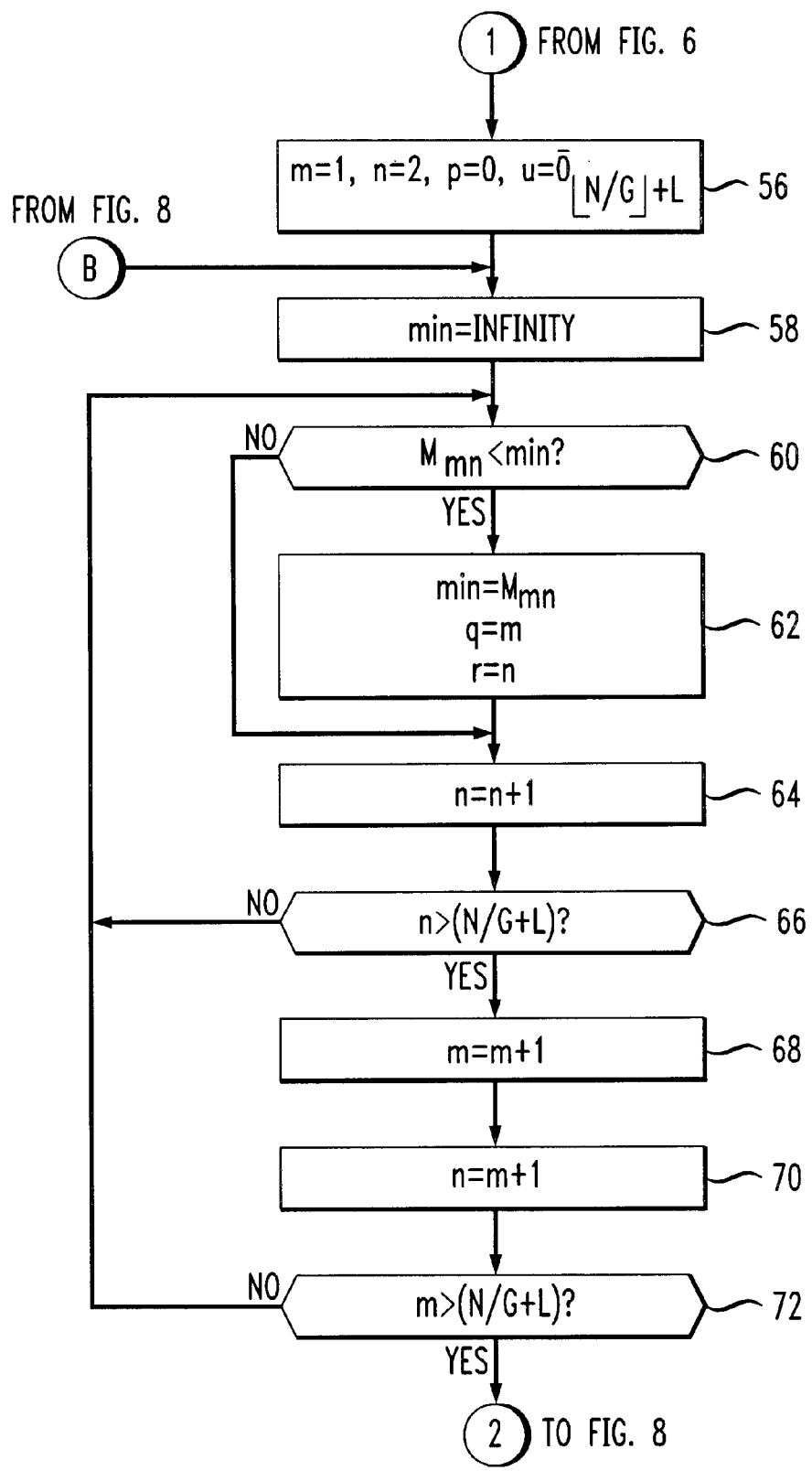

After running through all possible combinations of m and n, the program advances to FIG. 7.

The next step is to select good pairings out of all the possible pairings. We start by choosing the pairing with the smallest value of $M_{mn}$. We then choose the pairing with the second smallest value of $M_{mn}$, then the pairing with the third smallest value, etc. The one constraint is that a particular $T_i$ can be selected for only one pairing. For example, assume that the smallest metric is $M_{34}$ (i.e., the combination of $T_3$ and $T_4$). This combination will be selected. Assume that the second smallest metric is $M_{24}$ (i.e., the combination of $T_2$ and $T_4$). This combination will not be selected because $T_4$ has already been selected. Thus, we move on to the third smallest metric. Etc.

FIG. 7 describes how the program searches for the smallest $M_{mn}$. Step 56 shows that the variables m and n are again used as counters to cycle through all the values that were calculated for $M_{mn}$. The variable "min" stores the minimum value of $M_{mn}$ found so far in step 58. Each $M_{mn}$ is then compared to min in step 60. The variables q and r are used to store the values of m and n corresponding to the minimum $M_{mn}$ in step 62. Steps 64–72 ensure that the program examines all calculated values of $M_{mn}$. At the end of the steps depicted in FIG. 7, $M_{qr}$ holds the value of the minimum $M_{mn}$.

Figure 8:
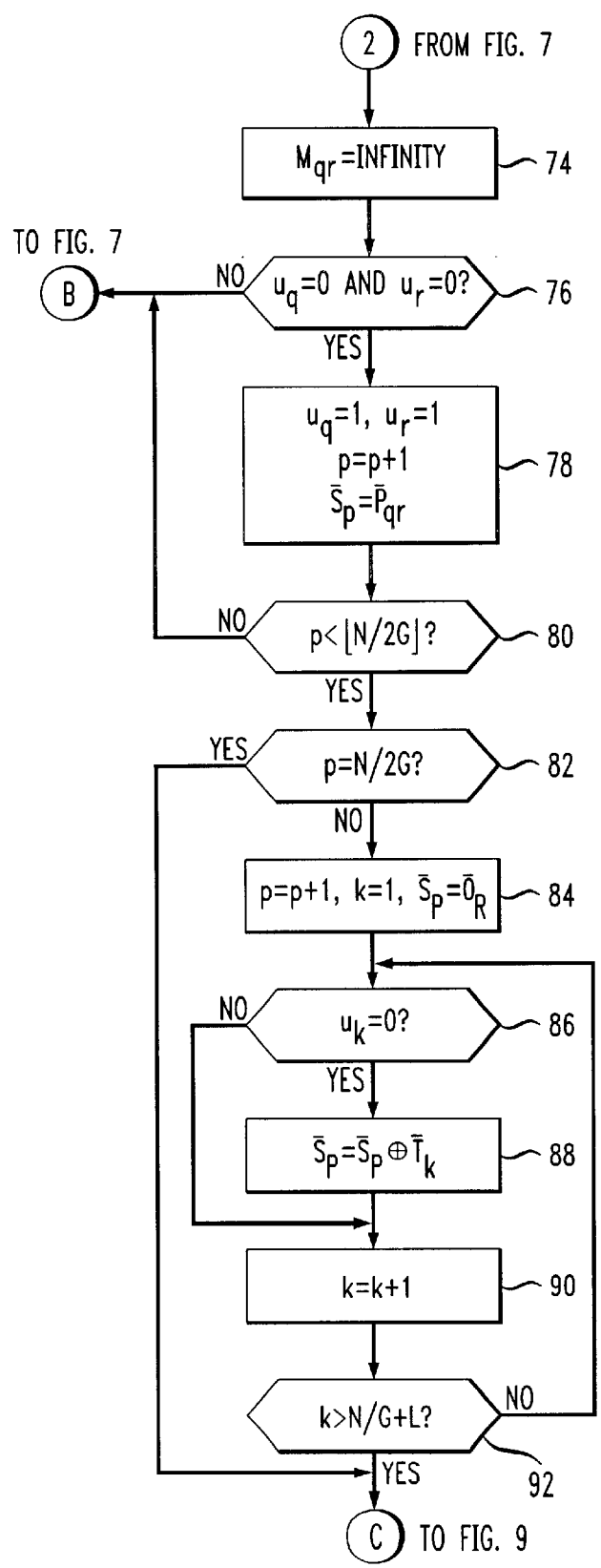

Turning to FIG. 8, $M_{qr}$ is set equal to infinity in step 74 to make sure the pairing will not be selected again.

The vector u is used to indicate whether a particular $T_i$ has been selected already. $u_i$ equals 0 if $T_i$ has not been selected yet, and $u_i$ equals 1 if $T_i$ has been selected already. In step 56 depicted in FIG. 7, u is initialized to the all-0 vector.

Before selecting a combination, the program checks to make sure that both $u_q$ and $u_r$ equal 0 in step 76. If they do, then the combination of $T_q$ and $T_r$ is selected, and the program sets both $u_q$ and $u_r$ equal to 1 in step 78. If they do not, then the program returns to step 58 depicted in FIG. 7 to find the next smallest $M_{mn}$.

The variable p is used in step 78 to count how many combinations have been selected thus far. The variable p is initialized to 0 in step 56 depicted in FIG. 7. When we select a $T_q$ and $T_r$ to combine, the program increments p, and then sets $S_p$ equal to $P_{qr}$, where $P_{qr}$ represents the combination of $T_q$ and $T_r$, in step 78.

The program needs to select $\lfloor N/2G \rfloor$ such pairings, where $\lfloor N/2G \rfloor$ indicates the greatest integer less than or equal to N/2G. Thus, in step 80, if p is not less than $\lfloor N/2G \rfloor$, the program returns to step 58 depicted in FIG. 7 to find the next smallest $M_{mn}$. If $p < \lfloor N/2G \rfloor$ then the program advances to step 82.

Figure 9:
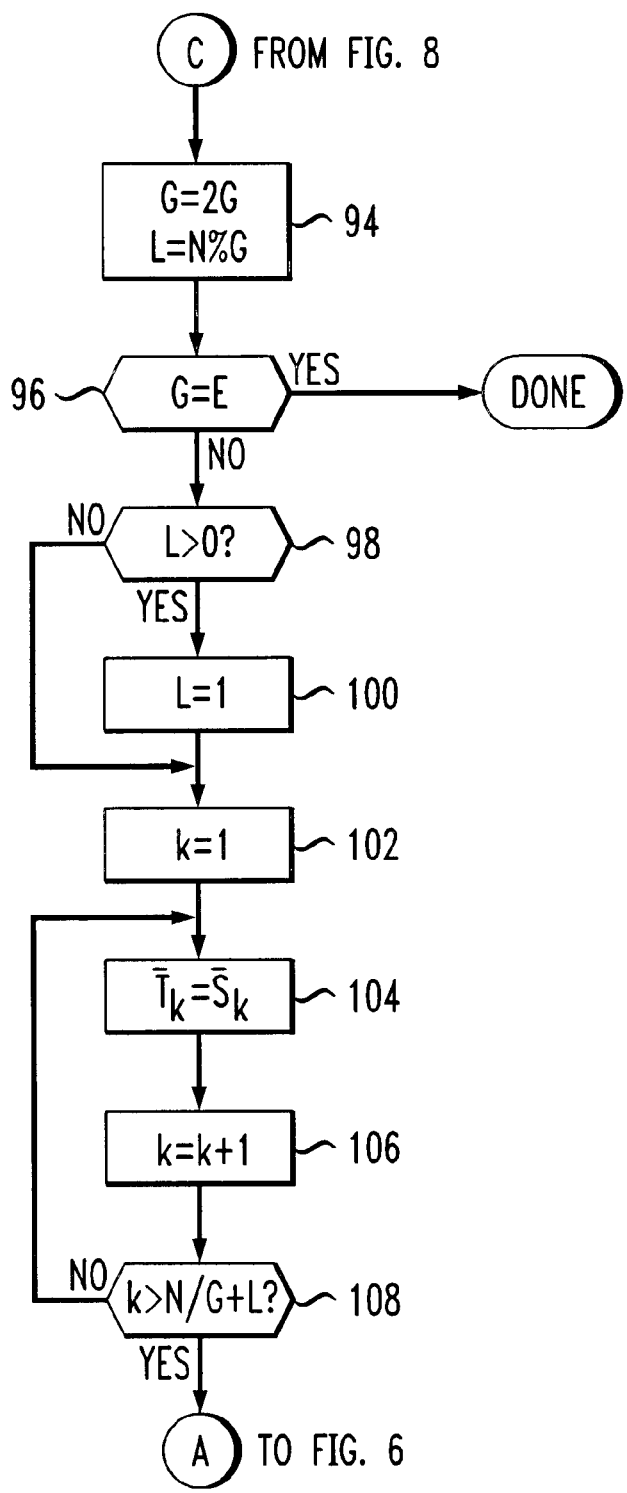

In step 82, if p=N/2G then the program advances to step 94 shown in FIG. 9. It is possible that N/2G is not an integer, in which case there are some $T_i$ left over after $\lfloor N/2G \rfloor$ pairings have been selected. For example, if N=14 and G=2, then three time-slot quads are formed, leaving two $T_i$ left over. Thus, if in step 82 p does not equal N/2G (indicating that N/2G is not an integer), the program initializes variables in step 84 and looks through all $u_k$ in step 86 to see which $T_k$ have not been used (the variable k is used as a counter). The vector $S_p$ is used in step 88 to store the combination of the leftover $T_k$. $S_p$ is initialized to the all-0 vector in step 84. As $T_k$ are found that have not already been used, they are ORed with $S_p$ in step 88. Steps 90 and 92 ensure that the program looks through all $T_k$.

At the end of the steps depicted in FIG. 8, the desired groupings for this cycle have been formed. The groupings are stored in $S_p$, for $1 \leq p \leq \lceil N/2G \rceil$, where $\lceil N/2G \rceil$ indicates the smallest integer greater than or equal to N/2G.

Turning to FIG. 9, G is doubled in step 94. If G equals E in step 96, then the program ends. The final groupings are stored in $S_p$, for $1 \leq p \leq \lceil N/E \rceil$, where $\lceil N/E \rceil$ indicates the smallest integer greater than or equal to N/E. For example, if we are forming OC-48s from OC-3s, then E equals 16. If N equals 35, then we have a total of three groupings (at least one is not a full OC-48). If in step 96 G does not equal E, then it is necessary to go through another cycle.

In step 94 L is set to the remainder after N is divided by G (%=modulus operator). In step 98, if N/G is an integer then L=0 and the program advances to step 102; otherwise, if N/G is not an integer then L is set to 1 in step 100. The $T_k$ are set equal to the $S_k$ in step 104, with steps 102, 106 and 108 used to ensure that the program cycles through all k. The program returns to step 42 depicted in FIG. 6.

To illustrate how the ring bundling process as taught herein is used by a person in the design of a ring, a simple example is now presented. It is assumed that a twelve-office ring has eight time slots that need to be bundled; for purposes of illustration, the bundling size is chosen to be four as opposed to sixteen. TABLE 1 lists the eight time slots, and the offices at which each time slot add/drops.

TABLE 1

| Time Slot # | Add/Drop Offices |
|---|---|
| 1 | 1, 4, 7, 9 |
| 2 | 2, 4, 6, 9, 11 |
| 3 | 1, 4, 9 |
| 4 | 3, 5, 7 |

TABLE 1-continued

| Time Slot # | Add/Drop Offices |
|---|---|
| 5 | 3, 8, 12 |
| 6 | 7, 10, 11, 12 |
| 7 | 4, 8, 9, 10 |
| 8 | 2, 5, 6, 11 |

TABLE 2

| Time Slot | Time Slot | Metric | Time Slot | Time Slot | Metric |
|---|---|---|---|---|---|
| <u>1</u> | <u>3</u> | <u>.57</u> | 6 | 7 | <u>.88</u> |
| <u>2</u> | <u>8</u> | <u>.67</u> | 6 | 8 | .88 |
| 3 | 7 | .71 | 2 | 6 | .89 |
| 1 | 7 | .75 | 1 | 5 | 1 |
| 2 | 3 | .75 | 1 | 8 | 1 |
| 1 | 2 | .78 | 2 | 4 | 1 |
| 2 | 7 | .78 | 2 | 5 | 1 |
| <u>4</u> | <u>5</u> | <u>.83</u> | 3 | 4 | 1 |
| 1 | 4 | .86 | 3 | 5 | 1 |
| 4 | 6 | .86 | 3 | 6 | 1 |
| 4 | 8 | .86 | 3 | 8 | 1 |
| 5 | 6 | .86 | 4 | 7 | 1 |
| 5 | 7 | .86 | 5 | 8 | 1 |
| 1 | 6 | .88 | 7 | 8 | 1 |

TABLE 3

| Time Slot Pair | Time Slot Pair | Metric |
|---|---|---|
| <u>1,3</u> | <u>2,8</u> | <u>.62</u> |
| 1,3 | 6,7 | .71 |
| <u>4,5</u> | <u>6,7</u> | <u>.75</u> |
| 2,8 | 6,7 | .77 |
| 2,8 | 4,5 | .91 |
| 1,3 | 4,5 | .92 |

The first step is to calculate a compatibility metric for each pair of time slots; it is assumed that Metric 1 is chosen as the metric. In TABLE 2, the compatibility metric is listed for each of the twenty-eight pairs of time slots; the list has been sorted from most compatible to least compatible (i.e., least value of the metric to greatest value of the metric). The lines having the underlined values therein indicate the pairs that will be chosen:

Add/Drops in union of time slots 1 and 3: 1,4,7,9

Add/Drops in union of time slots 2 and 8: 2,4,5,6,9,11

Add/Drops in union of time slots 4 and 5: 3,5,7,8,12

Add/Drops in union of time slots 6 and 7: 4,7,8,9,10,11,12

Next, pairs of time-slot-pairs are considered. TABLE 3 lists the compatibility metric for each of the six pairs of selected time-slot pairs. This yields our final pairings of:

Add/Drops in union of time slots 1,2,3,8: 1,2,4,5,6,7,9,11

Add/Drops in union of time slots 4,5,6,7: 3,4,5,7,8,9,10, 11,12

The total number of ADMs needed in this ring is then: 8+9=17 (where we assume the ADM capacity is four time slots). If an ADM were placed at each office for each time slot grouping there would be 24 required ADMs.

The ADM products of some manufacturers have a granularity of OC-1 as opposed to OC-3, where forty-eight OC-1 time slots are bundled together to form OC-48s. The ring bundling process according to the invention can be extended to handle this case: after bundling the time slots into sets of sixteen, a compatibility metric is calculated for triplets of these sets (the metrics given above can easily be extended to handle triplets). The same sorting and selection procedure is performed as described above to yield bundles of forty-eight OC-1 time slots. The run-time for this process is not significantly longer than the OC-3 case.

The ring bundling process taught herein reduces the number of ADMs required for a ring by 30 to 50% based on test results. In a large scale network, this represents a multi-million dollar cost savings. The percentage savings afforded by the process are greater with more OC-48s because there are more ways to group the time slots.

While several particular forms of the invention have been illustrated and described, it will also be apparent that various modifications can be made without departing from the spirit and scope of the invention.

What is claimed is:

1. A process for deploying a ring in a network, comprising:
   (a) configuring said ring to a plurality of offices and a plurality of optical fibers linking said plurality of offices, wherein each office initially comprises an add/drop multiplexer coupled to at least one optical fiber;
   (b) determining a path for OC-3 time slots grouped in one or more OC-48 optical signals through said ring;
   (c) calculating time slots required for a set of add/drop multiplexers in said path;
   (d) grouping the time slots into pairs and calculating a compatibility metric for each pair of time slots to form the optical signal after the path for each time slot has been determined; and
   (e) removing a set add/drop multiplexers from the ring that do not conform with the determined time slot requirement.

2. A process as defined in claim 1, wherein:
   multiple OC-48 optical signals are wavelength-division multiplexed on the ring.

3. A process as defined in claim 1, wherein:
   sixteen OC-3 time slots are grouped in each OC-48 optical signal.

4. A process for deploying a ring in a network, comprising the steps of:
   determining a first number of add/drop multiplexers at offices to link by optical fiber in a ring which transports time slots grouped in an optical signal;
   grouping the time slots into pairs and calculating a compatibility metric for each pair of time slots to form the optical signal after the path for each time slot has been determined; and
   determining a second number of add/drop multiplexers at selected offices in the ring by grouping said time slots in said optical signal whereby the first number of add/drop multiplexers is greater that the second number of add/drop multiplexers.

5. A process as defined in claim 4, wherein:
   the time slots conform to the OC-3 format, and the optical signal conforms to the OC-48 format.

6. A process as defined in claim 4, wherein:
   multiple optical signals are wavelength-division multiplexed in the ring.

7. A process for designing a ring to be deployed in a network, comprising the steps of:
   (A) selecting a plurality of offices which will form a ring which transports a number of time slots grouped in an optical signal;
   (B) determining a path for each time slot to be transported in the ring; and
   (C) grouping the time slots into pairs and calculating a compatibility metric for each pair of time slots to form the optical signal after the path for each time slot has been determined.

8. A process as defined in claim 7, further comprises the step of: determining the most compatible to the least compatible pairs of time slots through a traffic demand matrix between each pair of offices.

9. A process as defined in claim 7, wherein:
   each time slot conforms to the OC-3 format, and the optical signal conforms to the OC-48 format.

10. A process as defined in claim 7, wherein:
    step (B) is performed based on a list of all the time slots for the ring and the offices where each of the time slots adds or drops traffic.

11. A process as defined in claim 7, wherein step (C) further comprises the steps of sorting the pairs from most compatible to least compatible.

12. A process as defined in claim 11, wherein step (C) further comprises the steps of:
    selecting pairs of time slots in order to group the time slots in groups of four time slots until every time slot is included in one and only one group of four time slots;
    calculating a second compatibility metric for each group of four time slots; and
    sorting the groups of four time slots from most compatible to least compatible.

13. A process as defined in claim 12, wherein step (C) further comprises the steps of:
    selecting groups of four time slots in order to group the time slots in groups of eight time slots until every time slot is included in one and only one group of eight time slots;
    calculating a third compatibility metric for each group of eight time slots; and
    sorting the groups of eight time slots from most compatible to least compatible.

14. A process as defined in claim 13, wherein step (C) further comprises the step of:
    grouping the time slots into groups of sixteen time slots.

15. A process as defined in claim 7, wherein:
    the number of time slots is an integral multiple of sixteen.

16. A process for deploying a plurality of offices in a ring, wherein an add/drop multiplexer initially terminates a multiplexed optical signal at each office in the ring, comprising the steps of:
    (A) determining a path for each of a number of time slots;
    (B) grouping the time slots together in one or more multiplexed optical signals whereby the number of offices through which all the time slots pass is maximized; and
    (C) removing the add/drop multiplexer from each office through which all the time slots pass.

17. A process as defined in claim 16, wherein:
    the add/drop multiplexer allows time slots to be dropped and added at the office.

18. A process as defined in claim 16, wherein step (B) comprises the step of:
    determining which time slots add or drop traffic at each office.

19. A process as defined in claim 16, wherein step (B) comprises the step of:
    grouping together time slots having add/drops in common.

20. A process as defined in claim 16, further comprising the step of:

grouping sixteen time slots together to form the one or more multiplexed optical signals whereby the number of offices through which all sixteen time slots pass is maximized.

21. A process as defined in claim 16, further comprising the steps of:

grouping the time slots in pairs of time slots;

grouping the pairs of time slots in groups of four time slots;

grouping the groups of four time slots in groups of eight time slots; and grouping the groups of eight time slots in groups of sixteen time slots.

22. A process as defined in claim 21, wherein:

multiple optical signals are wavelength-division multiplexed in the ring.

23. An article of manufacture, comprising:

a computer-readable medium having stored thereon instructions for deploying a ring in a network, said ring comprising a plurality of offices and a plurality of optical fibers linking said plurality of offices, wherein said ring transports OC-3 time slots grouped in one or more OC-48 optical signals, and wherein each office initially comprises an add/drop multiplexer coupled to at least one optical fiber, said instructions, which when performed by a processor, cause the processor to execute a series of steps including:

(a) determining time slots required in a path for transporting the OC-3 time slots for a set of add/drop multiplexers;

(b) grouping the time slots into pairs and calculating a compatibility metric for each pair of time slots to form the optical signal after the path for each time slot has been determined; and (c) removing a set add/drop multiplexers from the ring that do not conform with the determined time slot requirement.

* * * * *